May 12, 1931.　　　　　R. CORDIER　　　　　1,804,460
CHORD FINDER
Filed May 25, 1928
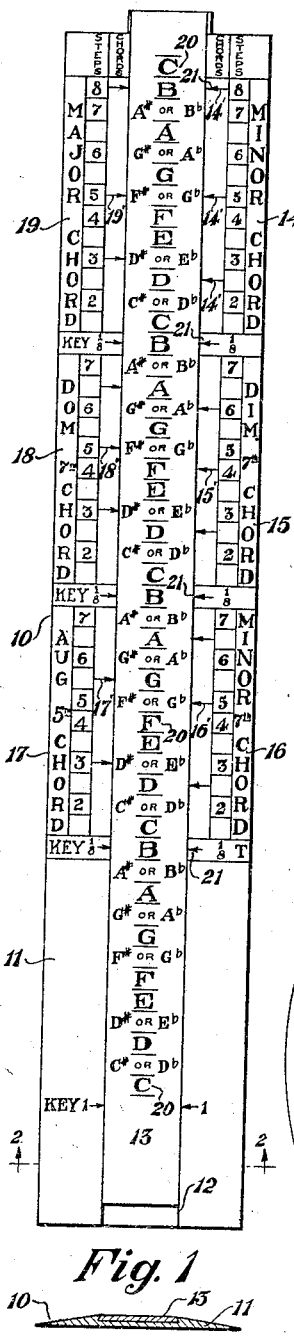
Fig. 1
Fig. 2
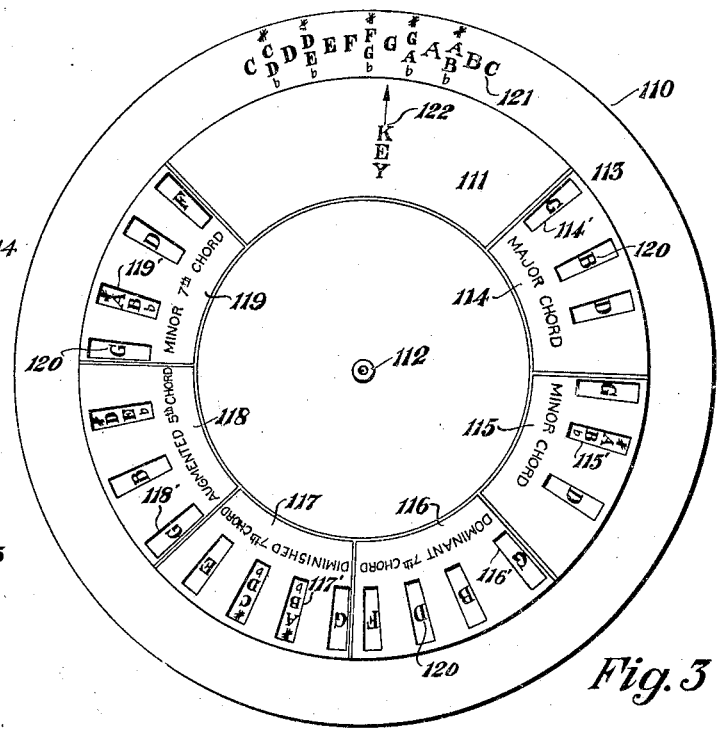
Fig. 3
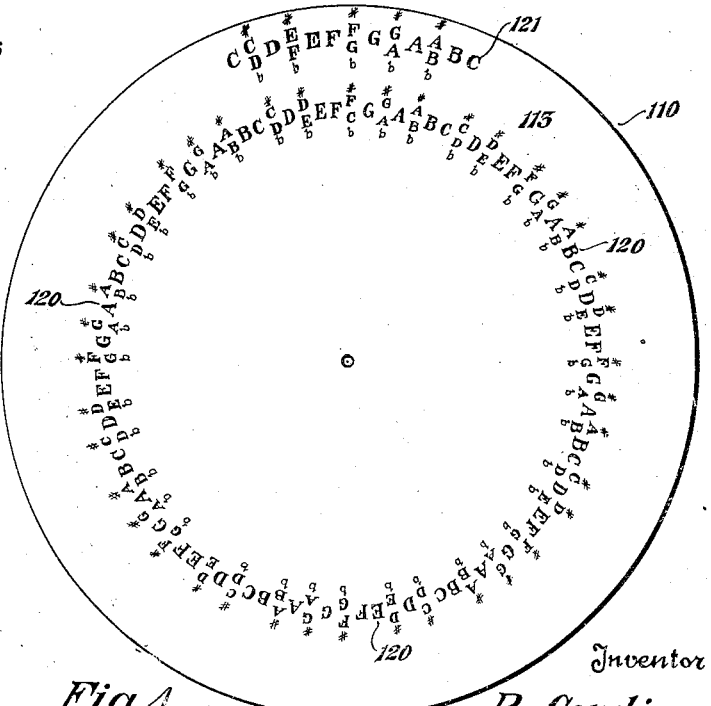
Fig. 4
Inventor
R. Cordier
By Harry Frease
Attorney Patented May 12, 1931

1,804,460

UNITED STATES PATENT OFFICE

RAYMOND CORDIER, OF CANTON, OHIO

CHORD FINDER

Application filed May 25, 1928. Serial No. 280,529.

My invention relates to chord finders for use by music students, composers, musical arrangers, orchestrators and the like, to enable the rapid finding of any of the several chords for any note or key.

For any note in a given octave, there are certain chords which will harmonize therewith, and which may include the following:—major; minor; dominant 7th; diminished 7th; augmented 5th; minor 7th.

It has heretofore been necessary for a musician to laboriously learn and memorize the various chords for each note.

The object of the present improvements is to provide a simple apparatus whereby any chord for any note may be rapidly found mechanically and visually indicated.

These objects are attained in the present improved chord finder of the present invention, as will be hereinafter set forth in detail and claimed.

Preferred embodiments of the invention are illustrated in the accompanying drawing forming part hereof, in which Figure 1 is a plan view of one form of the improved chord finder in which the parts are movable longitudinally with respect to each other;

Fig. 2, a cross section thereof as on line 2—2, Fig. 1;

Fig. 3, a view of another embodiment of the improved chord finder in which the parts are rotatable with respect to each other, and including improved means for visually indicating the chords; and Fig. 4, a view similar to Fig. 3 with one of the rotatable members removed.

Similar numerals refer to similar parts throughout the several views.

The embodiment of the invention indicated generally at 10 in Figs. 1 and 2 includes an indicator and guide member 11 having therein an outwardly opening longitudinally extending centrally located dovetailed groove 12 in which a designator and slide member 13 is arranged to slide.

Preferably at one side of the slide member, chord indicating panels 14, 15, and 16 are arranged on the guide member, and at the other side of the slide member chord indicating panels 17, 18, and 19 are arranged on the guide member.

For example, the chord indicating panel 14 may designate, as illustrated, the minor chord by means of a plurality of properly spaced arrow indicators 14′, it being understood that the minor chord consists of the first, the lowered 3rd and the 5th step of any scale and the arrows 14′ being longitudinally spaced accordingly.

Similarly, the chord indicating panel 15 designates as illustrated the diminished 7th chord, comprising the first, the lowered 3rd, the lowered 7th and the diminished 7th by suitably spaced arrow indicators 15′.

Likewise, the chord indicating panel 16 designates the minor 7th chord by suitably spaced arrow indicators 16′, the minor 7th chord comprising the lowered 3rd, the 5th, and the lowered 7th.

Likewise, the chord indicating panel 17 designates by suitably spaced arrow indicators 17′, the augmented 5th chord comprising the 1st, the 3rd, and the raised 5th.

Likewise, the chord indicating panel 18 designates by suitably spaced arrow indicators 18′, the dominant 7th chord, comprising the 1st, the 3rd, the 5th and the lowered 7th step of the scale.

And finally, the chord indicating panel 19 designates by suitably spaced arrow indicators 19′ the major chord comprising the 1st, the 3rd, and the 5th.

The slide member 13 has arranged thereon equally spaced literal designations 20 for the half tones comprising a plurality of octaves, although any other symbols for designating the tones may be used.

In using the chord finder 10, for example, to find any of the chords for the note or key B, the slide member is moved longitudinally until one of the literal designators B is opposite the key-note arrows 21 arranged on the guide member between the chord indicating panels.

The arrow indicators of the several chord indicating panels then point to the literal designators on the slide member, and visually indicate the notes of any of the chords for the note or tone B.

The preferred embodiment of the improved chord finder indicated generally at 110 in Figs. 3 and 4, includes an indicator member 111 rotatably secured as by means of a tubular rivet 112 to a designator member 113.

A plurality of circumferentially spaced chord indicating panels 114, 115, 116, 117, 118, and 119 are arranged on the outer surface of the indicator member 11, and the indicating panels comprise a literal title of the chord to be indicated, and suitably spaced slot indicators 114′, 115′, 116′, 117′, 118′, and 119′ respectively.

For example, the chord indicating panel 114 may designate as illustrated the major chord by means of a plurality of the properly spaced slot indicators 114′.

Similarly the chord indicating panel 115 designates as illustrated the minor chord by the suitably spaced slot indicators 115′.

Likewise the chord indicating panel 116 designates as illustrated the dominant 7th chord by the suitably spaced slot indicators 116′.

Likewise the chord indicating panel 117 designates as illustrated by the suitably spaced slot indicators 117′ the diminished 7th chord.

Likewise the chord indicating panel 118 designates by suitably spaced slot indicators 118′ the augmented 5th chord.

And finally the chord indicating panel 119 designates by suitably spaced slot indicators 119′ the minor 7th chord.

The designator member 113 has arranged thereon equally and circumferentially spaced literal designations 120 for the half tones comprising a plurality of octaves, although any other symbols for designating the tones may be used.

The centers of the literal designators 120 are arranged at the same radial distance from the tubular rivet 112 as the centers of the slot indicators.

The indicator member 111 is preferably in the form of a circular disk of less area than the designator member 113, which may likewise be in the form of a circular disk.

The designator member 113 has also arranged thereon a plurality of equally and circumferentially spaced key note designators 121 for the half tones comprising at least one octave preferably adjacent the outer periphery thereof and outside of the outer periphery of the indicator member 111.

A properly spaced radial pointing key note indicating arrow 122 is provided on the indicator member 111.

In using the chord finder 110, for example, in finding any of the chords for the note or key G as illustrated, the indicator and designator members are rotated with respect to each other until the key note indicating arrow 122 points to the literal designator G, and the several slot indicators will then visually indicate the notes comprising any of the chords for the note or tone G, hiding all the remaining half tone designators 120.

Accordingly the chord finder 110 is somewhat easier to read than the chord finder 10.

I claim:

1. A chord finder including an indicator member and a designator member movable with respect to each other, a plurality of tone designators on the designator member, and a plurality of means on the indicator member for visually indicating the tones of chords on the designator member and for covering from view all the other tone designators on the designator member.

2. A chord finder including an indicator member and a designator member rotatably movable with respect to each other, a plurality of tone designators on the designator member, and a plurality of means on the indicator member for visually indicating the tones of chords on the designator member and for covering from view all the other tone designators on the designator member.

In testimony that I claim the above, I have hereunto subscribed my name.

RAYMOND CORDIER.